United States Patent
Abe

(10) Patent No.: US 11,241,872 B2
(45) Date of Patent: Feb. 8, 2022

(54) APPARATUS FOR MANUFACTURING STACK OF SHEET-SHAPED ELECTRODES

(71) Applicant: TOYOTA JIDOSHA KABUSHIKI KAISHA, Toyota (JP)

(72) Inventor: Nobuhira Abe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 16/573,033

(22) Filed: Sep. 17, 2019

(65) Prior Publication Data

US 2020/0144589 A1 May 7, 2020

(30) Foreign Application Priority Data

Nov. 6, 2018 (JP) .............................. JP2018-208928

(51) Int. Cl.
| | | |
|---|---|---|
| *H01M 10/04* | (2006.01) |
| *H01M 4/04* | (2006.01) |
| *H01M 4/139* | (2010.01) |
| *B32B 37/10* | (2006.01) |
| *B65G 54/02* | (2006.01) |

(52) U.S. Cl.
CPC .......... *B32B 37/10* (2013.01); *H01M 4/0404* (2013.01); *H01M 4/139* (2013.01); *H01M 10/0404* (2013.01); *B65G 54/02* (2013.01)

(58) Field of Classification Search
CPC .. H01M 10/0404; H01M 10/04; H01M 4/139; H01M 4/0404; H01M 4/04; B23B 37/10; Y02E 60/10; Y02P 70/50
See application file for complete search history.

(56) References Cited

FOREIGN PATENT DOCUMENTS

| | | | | |
|---|---|---|---|---|
| JP | 2010-212165 A | | 9/2010 | |
| JP | 2013177217 A | * | 9/2013 | ............... B65G 1/00 |
| JP | 2016081558 A | * | 5/2016 | ............ H01M 10/04 |
| JP | 2016-157586 A | | 9/2016 | |

OTHER PUBLICATIONS

English Translation of JP 2016081558 A, Toyota Ind Corp., Apparatus for manufacturing electrode assembly and method of manufacturing the electrode assembly, 2016 (Year: 2016).*
English Translation of JP 2013177217A, Daifuku KK, Fujitsu Telecom Networks LTD, Article conveying facility, 2013 (Year: 2013).*

* cited by examiner

*Primary Examiner* — Maria Laios
*Assistant Examiner* — Adam J Francis
(74) *Attorney, Agent, or Firm* — Sughrue Mion, PLLC

(57) ABSTRACT

A sheet-shaped electrode conveyance device (A) for conveying the sheet-shaped electrodes (1) to the stacking station is covered by the sealing walls (50). The inside of the sealing walls (50) is divided along the conveyance route of the sheet-shaped electrode (1) by the partitions (57, 58, 59, and 60) into the inside space regions (Z1, Z2, Z3, Z4, and Z5). Dry air is supplied to the inside space regions (Z1, Z2, Z3, Z4, Z5). If there is an abnormal sheet-shaped electrode (1) inside any of the inside space regions (Z1, Z2, Z3, Z4, Z5), the conveyor plates (20) other than the conveyor plate (20) carrying the abnormal sheet-shaped electrode (1) are retracted to the inside space regions other than the inside space region where the abnormal sheet-shaped electrode (1) is present.

5 Claims, 14 Drawing Sheets

APPARATUS FOR MANUFACTURING STACK OF SHEET-SHAPED ELECTRODES

FIELD

The present invention relates to an apparatus for manufacturing a stack of sheet-shaped electrodes.

BACKGROUND

Known in the art is a battery module manufacturing apparatus designed to wrap a positive electrode, negative electrode, electrolyte, and other components of an all solid state battery by a laminate film to form a thin-walled box-shaped laminate battery, attach such a laminate battery to a jig for holding the ends of the peripheral edges of the laminate battery, stack such laminate batteries attached to jigs in states attached to the jigs, constrain the stacked laminate batteries in the stacking direction, detach all of the jigs from the laminate batteries after constraining them, and thereby manufacture a battery module comprised of a stack of laminate batteries (for example, see Japanese Unexamined Patent Publication No. 2016-157586).

SUMMARY

Technical Problem

However, if such a positive electrode, negative electrode, electrolyte, or other components of an all solid state battery are exposed to the atmosphere, there is the big problem that they end up deteriorating due to the moisture contained in the atmosphere. However, in the above-mentioned battery module manufacturing apparatus, such a problem is not considered at all.

Solution to Problem

According to the present invention, there is provided an apparatus for manufacturing a stack of sheet-shaped electrodes comprising;
 a sheet-shaped electrode conveyance device having a rail extending along a conveyance route, a plurality of movers of linear motors moving on the rail, and conveyor plates attached to the movers to convey sheet-shaped electrodes to a stacking station, each conveyor plate carrying a sheet-shaped electrode,
 sealing walls surrounding the sheet-shaped electrode conveyance device and having partitions which divide an inside of the sealing walls into at least three inside space regions along the conveyance route, opening portions for passage of movers and conveyor plates being formed in the partitions, dry air being supplied to at least some of the inside space regions, and
 an operation control device for making conveyor plates other than the conveyor plate carrying an abnormal sheet-shaped electrode retract to inside space regions other than the inside space region where the abnormal sheet-shaped electrode is present when the abnormal sheet-shaped electrode exists in any of the inside space regions.

Advantageous Effects of Invention

It becomes possible to take out only an abnormal sheet-shaped electrode without exposing the retracted sheet-shaped electrodes to the atmosphere. Therefore, it is possible to greatly reduce the number of sheet-shaped electrodes deteriorating due to exposure to the atmosphere.

DESCRIPTION OF EMBODIMENTS

Figure 3A:
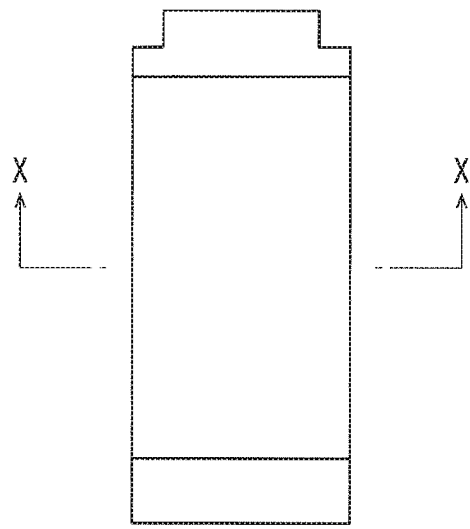
FIGS. 3A, 3B, 3C, and 3D are views for explaining a unit cell and sheet-shaped electrodes.
Figure 3B:
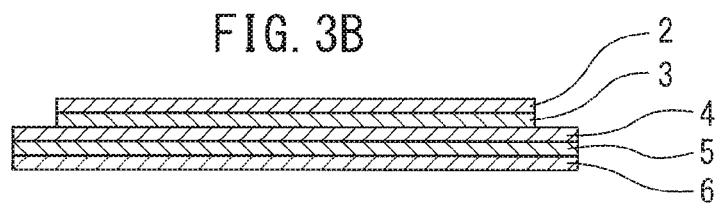

The present invention relates to an apparatus for manufacturing a stack of sheet-shaped electrodes. From this stack of sheet-shaped electrodes, for example, a battery to be mounted in a vehicle is formed. Therefore, first, the sheet-shaped electrodes forming this stack will be explained. FIG. 3A and FIG. 3B respectively show a plan view of the components of the battery manufactured using this sheet-shaped electrode, that is, a unit fuel cell, and a cross-sectional view of the unit cell seen along the line X-X of FIG. 3A. Note that, the thickness of the unit cell is 1 mm or less. Therefore, in FIG. 3B, the thicknesses of the layers are shown considerably exaggerated.

Figure 2:
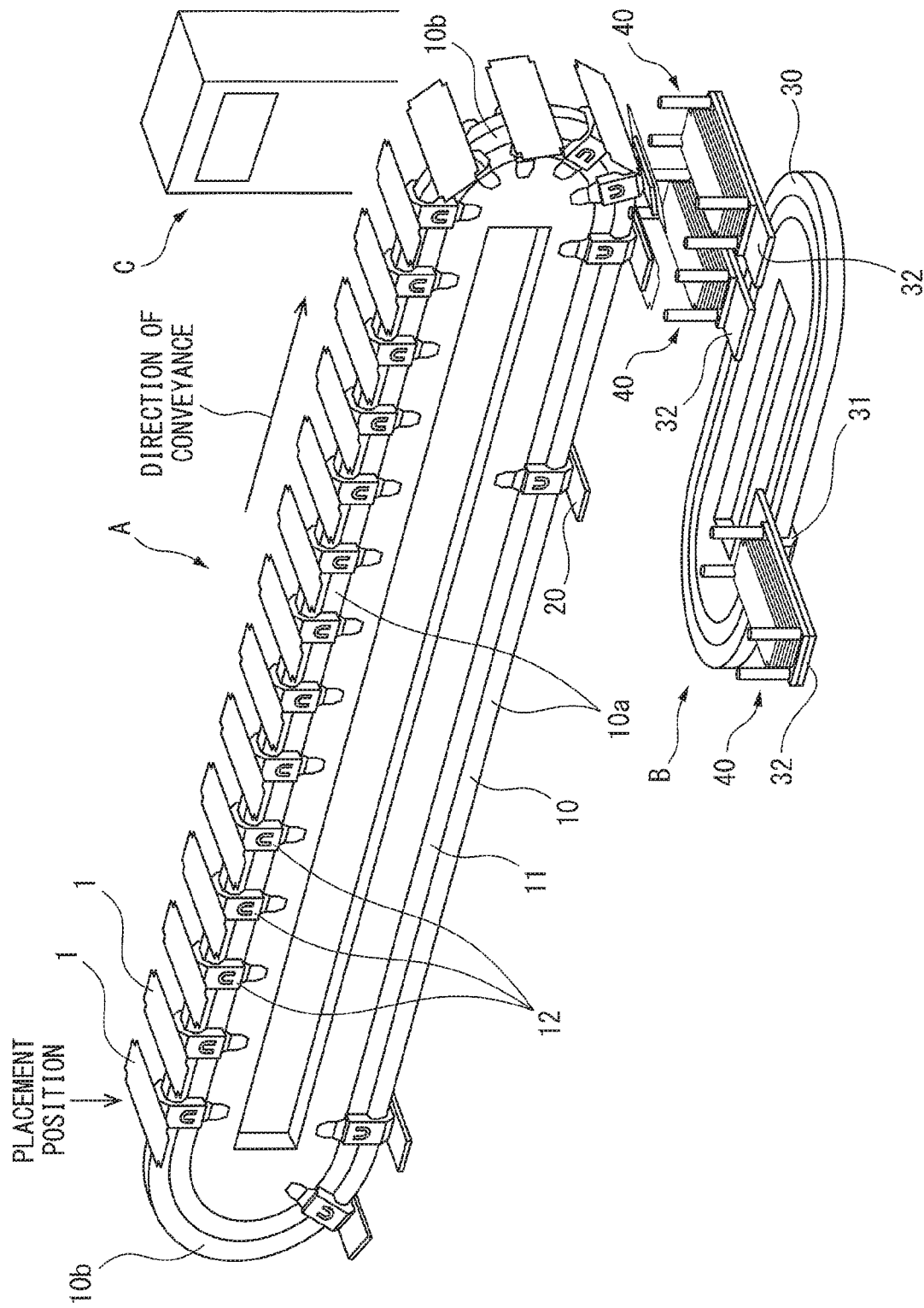
FIG. 2 is an overall view of a sheet-shaped electrode conveyance device and jig conveyance device showing the state when sealing walls are removed.

Referring to FIG. 3B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The positive electrode current collector layer 2 is formed from a conductive material. In this embodiment according to the present invention, this positive electrode current collector layer 2 is formed from metal foil for current collection use, for example, aluminum foil. Further, the positive electrode active material layer 3 is formed from a positive electrode active material able to store lithium ions, sodium ions, calcium ions, and other metal ions at the time of discharge and to release them at the time of charging. Further, the solid electrolyte layer 4 is formed from a material having conductivity with respect to lithium ions, sodium ions, calcium ions, and other metal ions and able to be utilized as a material for an all solid state battery.

On the other hand, the negative electrode active material layer 5 is formed from a negative electrode active material able to release lithium ions, sodium ions, calcium ions, and other metal ions at the time of discharge and to store them at the time of charging. Further, the negative electrode current collector layer 6 is formed from a conductive material. In this embodiment according to the present invention, this negative electrode current collector layer 2 is formed from metal foil for current collection use, for example, copper foil. Further, as will be understood from the above-mentioned explanation, the batteries manufactured in this embodiment of the present invention are all solid state batteries. In this case, the batteries are preferably all solid lithium ion secondary batteries.

Figure 3C:
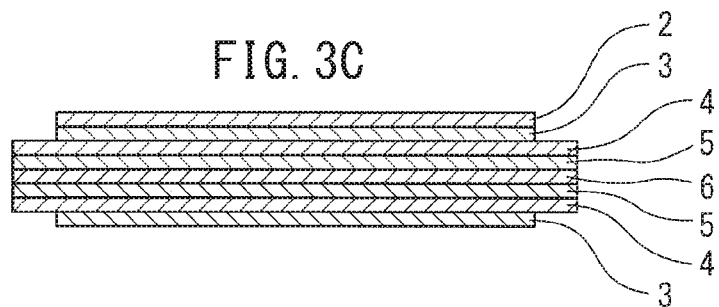
Figure 3D:
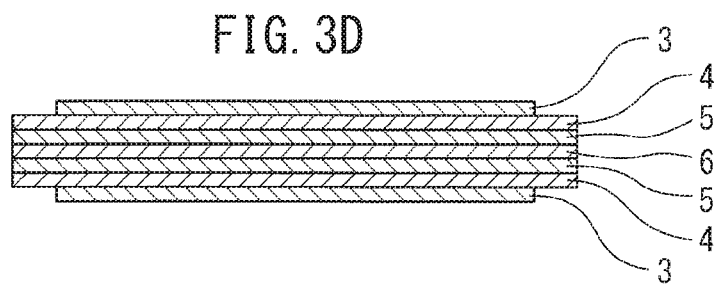

Now then, a sheet-shaped electrode used in the embodiment according to the present invention has a rectangular plan shape similar to FIG. 3A and has a cross-sectional structure shown in FIG. 3C or FIG. 3D. Note that, these FIG. 3C and FIG. 3D show cross-sectional views at positions similar to the X-X line of FIG. 3A. Note that, in these FIG. 3C and FIG. 3D as well, in the same way as FIG. 3B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The sheet-shaped electrode shown in FIG. 3C has a negative electrode current collector layer 6 positioned at its center part. In the upward direction from this negative electrode current collector layer 6, a negative electrode active material layer 5, solid electrolyte layer 4, positive electrode active material layer 3, and positive electrode current collector layer 2 are successively formed. In the downward direction from the negative electrode current collector layer 6, a negative electrode active material layer 5, solid electrolyte layer 4, and positive electrode active material layer 3 are successively formed. In this case, in the embodiment according to the present invention, the negative electrode current collector layers 6 are formed from copper foil, while the positive electrode current collector layers 2 are formed from aluminum foil.

On the other hand, the sheet-shaped electrode shown in FIG. 3D has a negative electrode current collector layer 6 positioned at its center part. In each of the upward direction and downward direction from this negative electrode current collector layer 6, a negative electrode active material layer 5, solid electrolyte layer 4, and positive electrode active material layer 3 are successively formed. That is, the sheet-shaped electrode shown in FIG. 3D does not have the positive electrode current collector layer 2. In the case shown in FIG. 3D as well, the negative electrode current collector layer 6 is formed from copper foil. In the embodiment according to the present invention, the sheet-shaped electrode of the cross-sectional shape shown in FIG. 3D is formed in advance, and as explained later, in the middle of the stacking process, aluminum foil (positive electrode current collector) is bonded to the sheet-shaped electrode of the cross-sectional shape shown in FIG. 3D. As a result, the sheet-shaped electrode of the cross-sectional shape shown in FIG. 3C, that is, the sheet-shaped electrode with aluminum foil 2 bonded to it, is formed.

In the embodiment according to the present invention, the sheet-shaped electrode to which this aluminum foil 2 is bonded is called the "sheet-shaped electrode 1". Note that, in the explanation of the embodiments according to the present invention, if not considered particularly confusing, the sheet-shaped electrode of the cross-sectional shape shown in FIG. 3D to which no aluminum foil 2 is bonded will also be called a "sheet-shaped electrode 1". As opposed to this, if it is desirable to express differentiated the sheet-shaped electrode 1 to which aluminum foil 2 is bonded and the sheet-shaped electrode 1 to which aluminum foil 2 is not bonded, the sheet-shaped electrode to which aluminum foil 2 is bonded will be called a "sheet-shaped electrode 1 with a positive electrode", while the sheet-shaped electrode to which aluminum foil 2 is not bonded will be referred to as a "sheet-shaped electrode 1 without a positive electrode".

Note that, the sheet-shaped electrodes 1 shown in FIG. 3C and FIG. 3D show single illustrations. Use of various structures of sheet-shaped electrodes 1 may be considered. For example, on one surface of the copper foil 6, it is possible to form a negative electrode active material layer 5, solid electrolyte layer 4, positive electrode active material layer 3, and positive electrode current collector layer 2, to form a negative electrode active material layer 5, solid electrolyte layer 4, and positive electrode active material layer 3, to form a negative electrode active material layer 5 and solid electrolyte layer 4, or to form only a negative electrode active material layer 5, while on the other surface of the copper foil 6, it is possible to form a negative electrode active material layer 5 and solid electrolyte layer 4 or form only a negative electrode active material layer 5 or to not form anything. Further, instead of the copper foil 6, it is possible to use the aluminum foil for forming the positive electrode current collector layer 2 and form on one surface of this aluminum foil 2 a positive electrode active material layer 3, solid electrolyte layer 4, negative electrode active material layer 5, and negative electrode current collector layer 6, to form a positive electrode active material layer 3, solid electrolyte layer 4, and negative electrode active material layer 5, to form a positive electrode active material layer 3 and solid electrolyte layer 4, or to form only a positive electrode active material layer 3 and possible to form on the other surface a positive electrode active material layer 3, solid electrolyte layer 4, and negative electrode active material layer 5, to form a positive electrode active material layer 3 and solid electrolyte layer 4, to form only a positive electrode active material layer 3, or to not form anything at all in the structure.

Therefore, if expressing this comprehensively, in the present invention, the sheet-shaped electrode 1 includes metal foil 2 or 6 for current collection use and at least one of a positive electrode active material layer 3 and negative electrode active material layer 5 formed on the metal foil 2 or 6 for current collection use. Note that, below, embodiments of the present invention will be explained taking as an example the case of the sheet-shaped electrode 1 having a structure shown in any of FIG. 3C and FIG. 3D.

Figure 1:
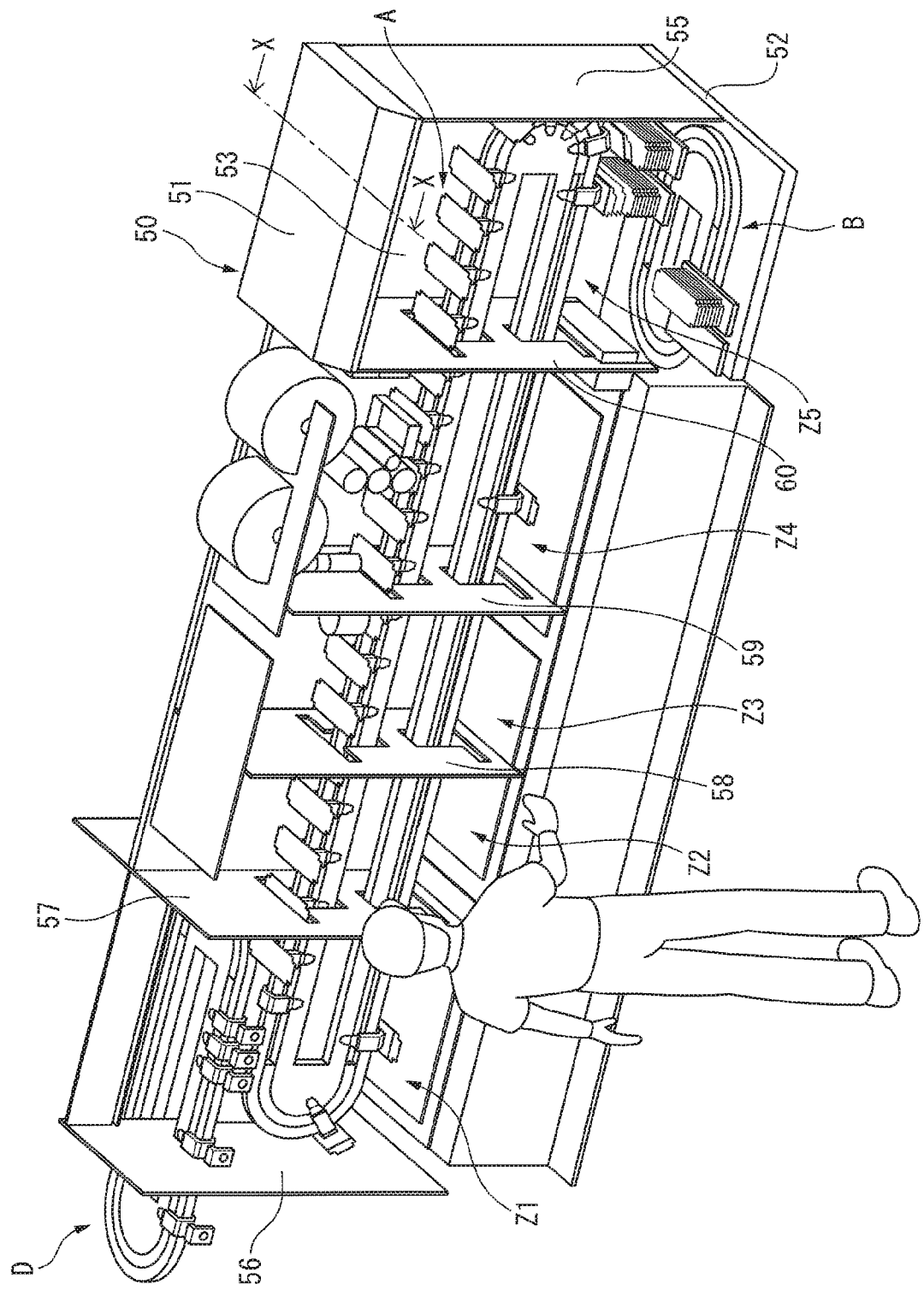
FIG. 1 is an overall view of a sheet-shaped electrode conveyance device and jig conveyance device.

Referring to FIG. 1 and FIG. 2, FIG. 1 shows an overall view of a sheet-shaped electrode conveyance device A and jig conveyance device B. FIG. 2 shows an overall view of a sheet-shaped electrode conveyance device A and jig conveyance device B showing the state where the sealing walls are removed. At the placement position shown by the arrow in FIG. 2, sheet-shaped electrodes 1 without positive electrodes with a cross-sectional shape shown in FIG. 3D are supplied. This sheet-shaped electrode 1 is conveyed by the sheet-shaped electrode conveyance device A in the direction of conveyance shown by the arrow for forming a stack including the sheet-shaped electrodes 1.

Figure 4:
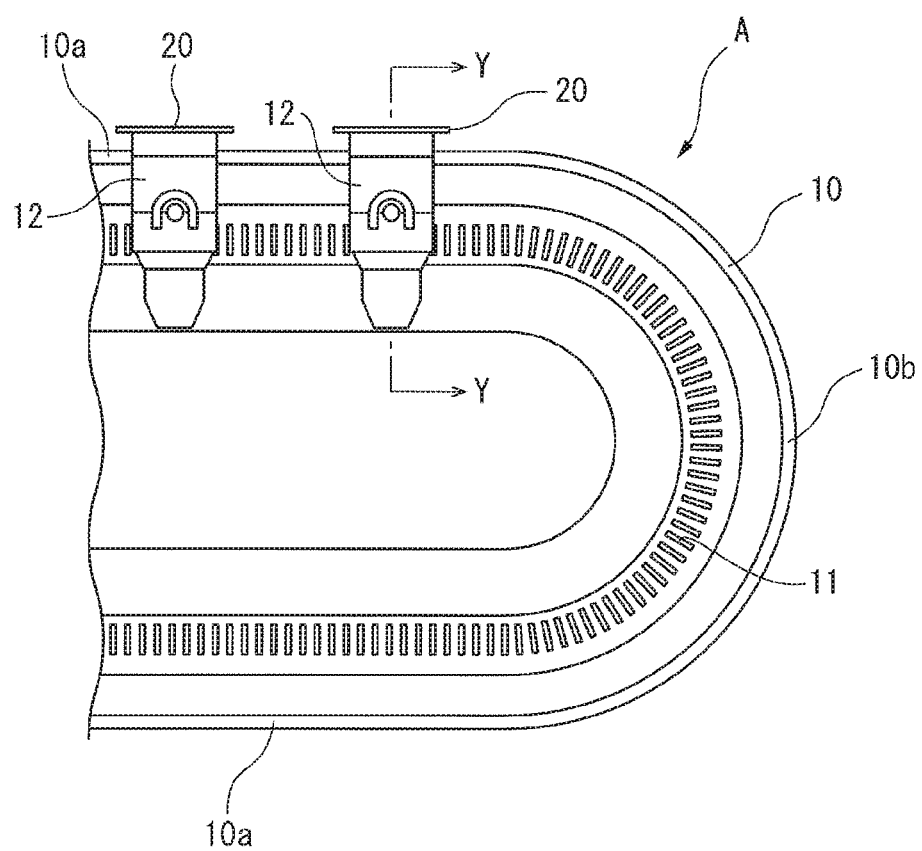
FIG. 4 is an enlarged side view of part of a sheet-shaped electrode conveyance device shown in FIG. 1 and FIG. 2.
Figure 5:
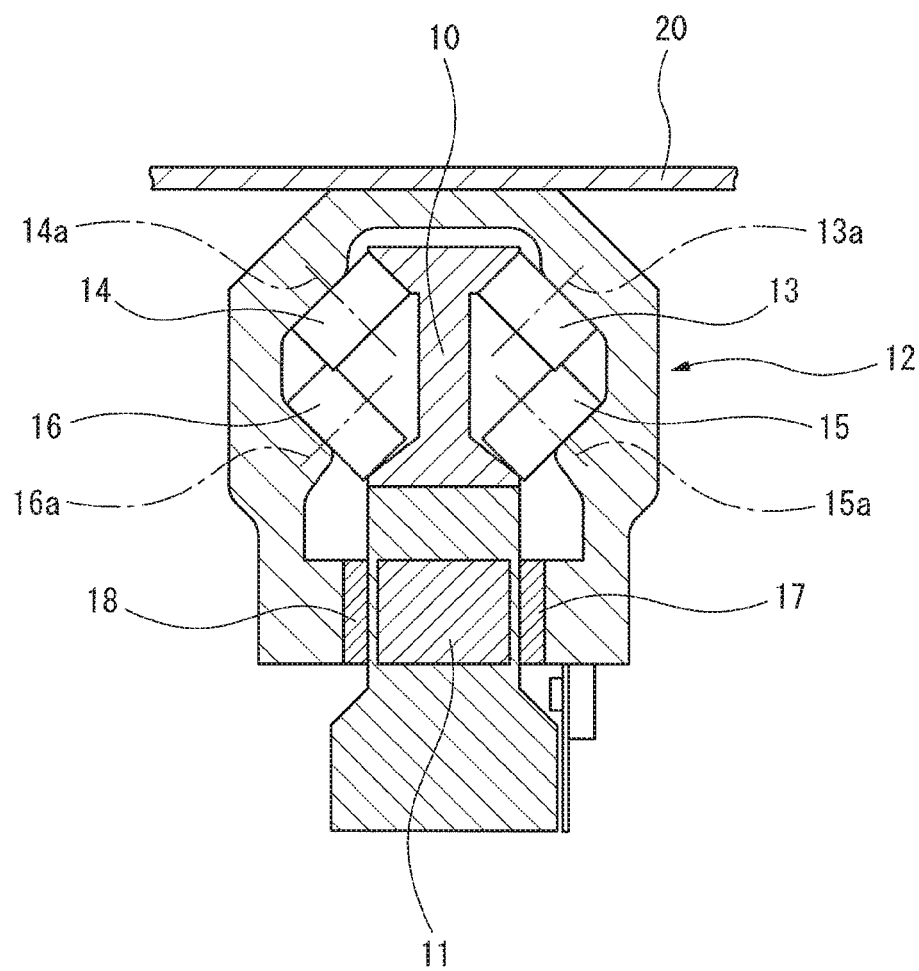
FIG. 5 is a cross-sectional view of a mover.

First, while referring to FIG. 2 and FIG. 4 in which the structure of this sheet-shaped electrode conveyance device A can be easily understood, this sheet-shaped electrode conveyance device A will be explained. Note that FIG. 4 shows an enlarged side view of part of the sheet-shaped electrode conveyance device A shown in FIG. 2. Referring to FIG. 2 and FIG. 4, the sheet-shaped electrode conveyance device A is provided with an elliptical shaped rail 10 comprised of horizontal straight parts 10a spaced apart from each other in the vertical direction in the vertical plane and a pair of semicircular parts 10b and a plurality of movers 12 able to move on this rail 10. FIG. 5 shows a cross-sectional view of a mover 12 seen along the Y-Y line of FIG. 4. As shown in FIG. 5, this mover 12 is provided with a pair of guide rollers 13 attached to the mover 12 to be able to rotate about axes 13a and roll on the rail 10 (arranged at the front and rear in the direction of advance), a pair of guide rollers 14 attached to the mover 12 to be able to rotate about axes 14a and roll on the rail 10 (arranged at the front and rear in the direction of advance), a guide roller 15 attached to the mover 12 to be able to rotate about an axis 15a and roll on the rail 10, and a guide roller 16 attached to the mover 12 to be able to rotate about an axis 16a and roll on the rail 10.

On the other hand, this mover 12 is provided with a pair of permanent magnets 17, 18. Inside of the conveyance device A sandwiched between these permanent magnets 17, 18, a stator 11 around which a coil is wound is arranged. This stator 11 and permanent magnets 17, 18, that is, the stator 11 and mover 12, form a linear motor. Therefore, in the sheet-shaped electrode conveyance device A, the mover 12 of the linear motor is made to move on the rail 10. The speed of movement of this mover 12 etc. are controlled by an operation control device C shown in FIG. 2. Each mover 12 of the sheet-shaped electrode conveyance device A is, for example, numbered. Each mover 12 is controlled by the operation control device C independently for each mover 12.

Figure 6:
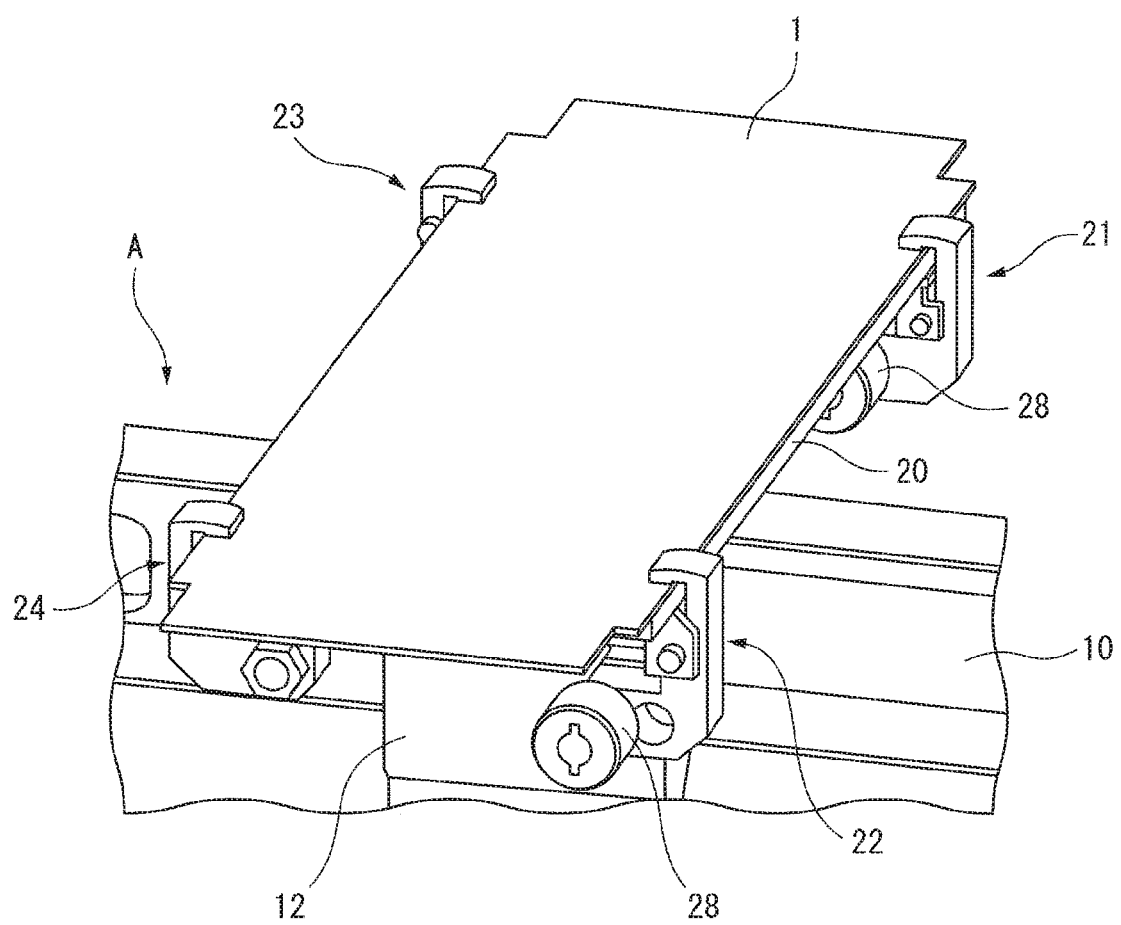
FIG. 6 is a perspective view of a conveyor plate.

As shown in FIG. 4 and FIG. 5, on the mover 12, a rectangular shaped conveyor plate 20 is attached. On this conveyor plate 20, a sheet-shaped electrode 1 is placed. FIG. 6 shows a perspective view of the conveyor plate 20 attached to the mover 12. Referring to FIG. 6, in the embodiment according to the present invention, the conveyor plate 20 has a plurality of clamps 21, 22, 23, 24 attached for clamping the sheet-shaped electrode 1 carried on the conveyor plate 20 against the conveyor plate 20 and holding the sheet-shaped electrode 1 at the placement position on the conveyor plate 20 during conveyance. In the embodiment shown in FIG. 6, a pair of clamps 21, 22 are attached spaced apart from each other at the front end part of the conveyor plate 20 positioned at the front in the direction of advance while a pair of clamps 23, 24 are attached spaced apart from each other at the rear end part of the conveyor plate 20 positioned at the rear in the direction of advance.

Figure 7A:
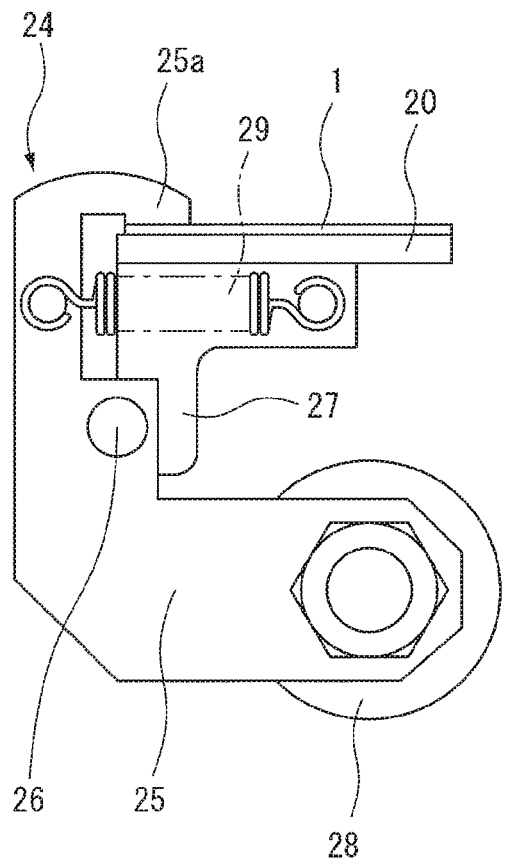
FIGS. 7A and 7B are views for explaining the operation of a clamp of the conveyor plate.
Figure 7B:
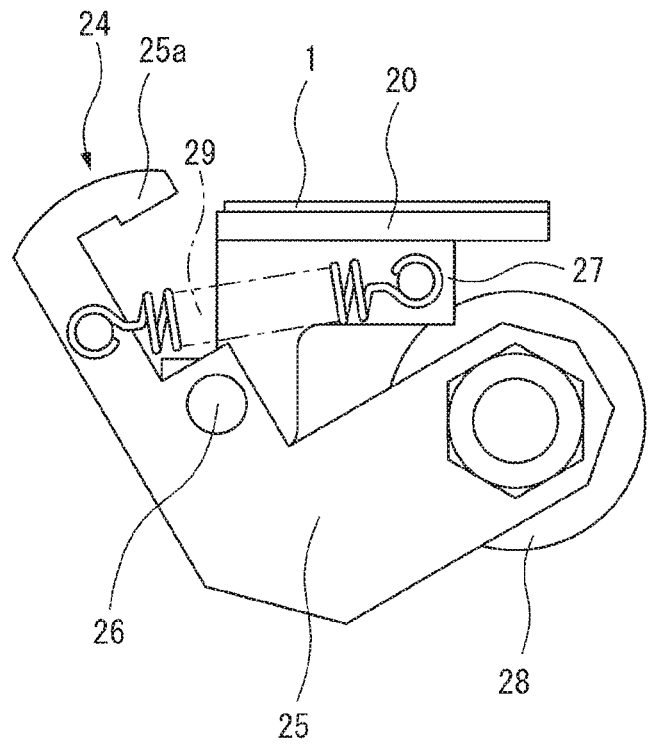

These clamps 21, 22, 23, 24 have the same structure. Therefore, the clamp 24 will be used as an example to explain the structure of the clamps. FIG. 7A shows the time when the sheet-shaped electrode 1 is clamped against the conveyor plate 20 by the clamp 24, while FIG. 7B shows the time when the clamp 24 releases the sheet-shaped electrode 1. Referring to FIG. 7A and FIG. 7B, the clamp 24 is provided with a clamp arm 25 forming a roughly speaking L-shape. The center part of this clamp arm 25 is attached by a support pin 26 to a support plate 27 fastened to the conveyor plate 20 to be able to rotate. One end of the clamp arm 25 is formed with a clamping part 25a extending to over the surface of the conveyor plate 20, while the other end of the clamp arm 25 has a roller 28 attached to it. The clamp arm 25 is constantly biased clockwise by a tension spring 29 attached between the clamp arm 25 and the support plate 27.

On the moving route of the mover 12, a stationary cam (not shown) able to engage with the roller 28 of the clamp arm 25 is provided. The roller 28 of the clamp arm 25 normally does not engage with this stationary cam. At this time, as shown in FIG. 7A, the sheet-shaped electrode 1 is clamped against the conveyor plate 20 by the clamping part 25a of the clamp arm 25 due to the spring force of the tension spring 29. On the other hand, if the roller 28 of the clamp arm 25 engages with the stationary cam, as shown in FIG. 7B, the roller 28 will rise and the sheet-shaped electrode 1 will be released from the clamping part 25a of the clamp arm 25.

Figure 8:
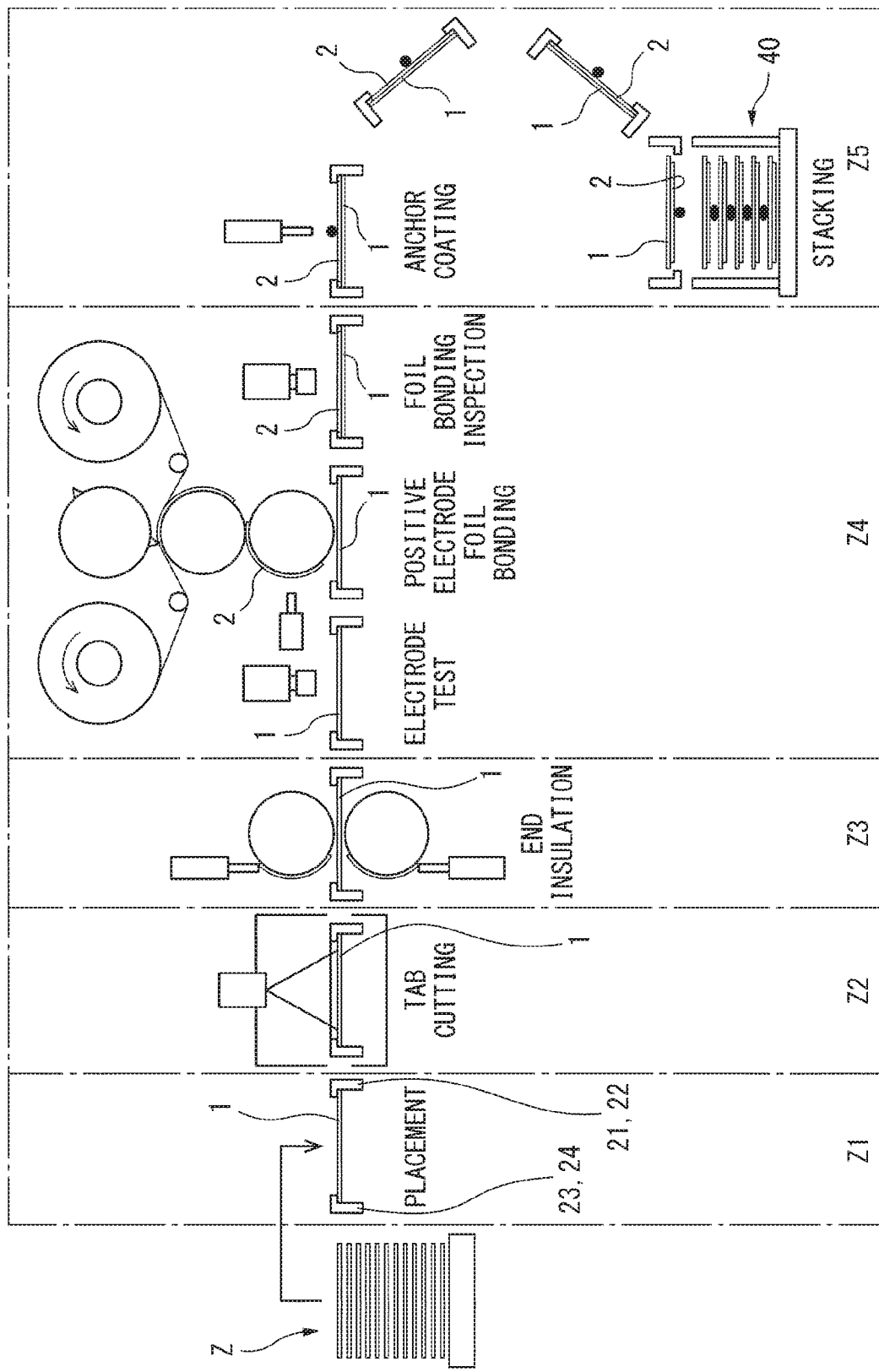
FIG. 8 is a view showing a stacking process of sheet-shaped electrodes.

Next, referring to FIG. 8, the process of stacking the sheet-shaped electrodes will be explained. FIG. 8 schematically shows this process of stacking the sheet-shaped electrodes. This FIG. 8 schematically shows the sheet-shaped electrodes 1 carried on the conveyor plates 20 and clamps 21, 22, 23, 24 attached to the conveyor plates 20. However, in FIG. 8, the conveyor plates 20 are omitted. Note that, this FIG. 8 shows various processing performed when the sheet-shaped electrodes 1 are conveyed by the sheet-shaped electrode conveyance device A.

In the embodiment according to the present invention, the two surfaces of a long narrow copper foil are successively coated at intervals in the longitudinal direction of the copper foil with negative electrode active material layers, solid electrolyte layers, and positive electrode active material layers so as to be superposed on each other. Next, this copper foil is cut into predetermined lengths to thereby prepare sheet-shaped electrodes 1 without positive electrodes with the cross-sectional shapes shown in FIG. 3D. These sheet-shaped electrodes 1 without positive electrodes are stacked on a storage platform for storage. Z in FIG. 8 shows the sheet-shaped electrodes 1 without positive electrodes stacked on the storage platform. The sheet-shaped electrodes 1 stacked on the storage platform are successively placed, one at a time, by a transfer device shown by D in FIG. 1 onto the conveyor plates 20 at the upper horizontal straight rail part 10a of the sheet-shaped electrode conveyance device A as shown by the arrow in FIG. 8 at the placement position shown by the arrow of FIG. 2. The part at which the sheet-shaped electrodes 1 without positive electrodes are placed is called a placement station.

While the sheet-shaped electrode 1 carried on the conveyor plate 20 at the upper horizontal straight rail part 10a is moving along the horizontal straight part 10a of the sheet-shaped electrode conveyance device A, first, a tab cutting processing in which the end parts of the copper foil 6 are cut to form a connection use electrode tab is performed. The part where this tab cutting processing is performed will be called a tab cutting processing station. Next, to prevent a short-circuit with the aluminum (positive electrode) foil, an end insulation processing is performed for coating part of the copper foil 6 with an insulating material. The part where this end insulation processing is performed will be called an end insulation processing station. Next, a sheet-shaped electrode 1 without a positive electrode is inspected. The part where this electrode inspection is performed will be called an electrode test station. At this electrode test station, for example, whether or not the connection use electrode tab is accurately formed and whether or not the insulating material is accurately coated is detected.

Next, a positive electrode foil bonding processing in which an aluminum (positive electrode) foil 2 is bonded on the sheet-shaped electrode 1 using an adhesive is performed. The part where this positive electrode foil bonding processing is performed is called a positive electrode foil bonding processing station. If the aluminum (positive electrode) foil 2 is bonded to the sheet-shaped electrode 1 carried on the conveyor plate 20, the sheet-shaped electrode 1 becomes a sheet-shaped electrode with a positive electrode of the cross-sectional shape shown in FIG. 3C. Next, a foil bonding inspection is performed for inspecting if the aluminum (positive electrode) foil 2 is suitably bonded to the sheet-shaped electrode 1. The part where this foil bonding inspection is performed will be referred to as a foil bonding inspection station. Next, an anchor coating processing is performed for coating the aluminum (positive electrode) foil 2 with an adhesive so that the stacked sheet-shaped electrodes 1 do not slip when sheet-shaped electrodes 1 with positive electrodes are stacked. The part where this anchor coating processing is performed will be referred to as an anchor coating processing station.

Next, if the conveyor plate 20 reaches the semicircular rail part 10*b* of the sheet-shaped electrode conveyance device A and starts to advance along the semicircular rail part 10*b*, as shown in FIG. 8, the conveyor plate 20 starts to be inverted. When the conveyor plate 20 reaches the bottom end of the semicircular rail part 10*b* of the sheet-shaped electrode conveyance device A, the conveyor plate 20 completely inverts. Next, when reaching the stacking station 40 of sheet-shaped electrodes 1, the stacking action of the sheet-shaped electrodes 1 is performed. If the stacking action is performed, the sheet-shaped electrode 1 with the positive electrode is taken off from the conveyor plate 20. The conveyor plates 20 now in the empty state are successively made to move to the placement position shown in FIG. 2.

Figure 9:
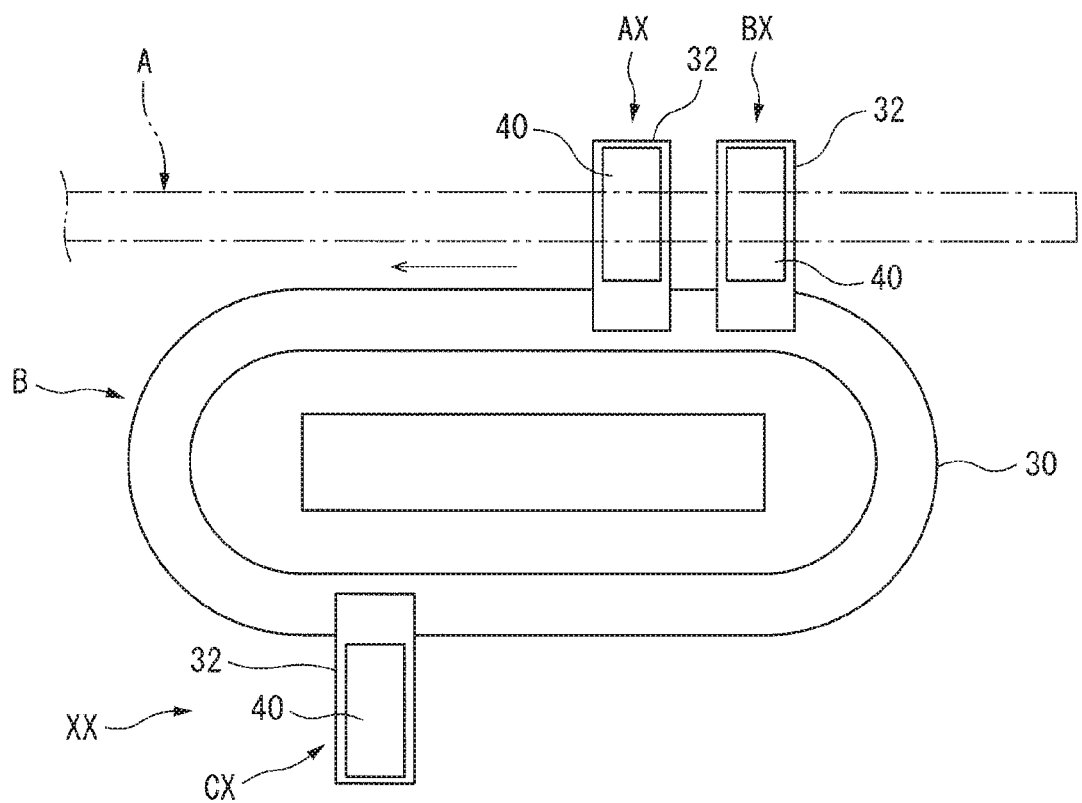
FIG. 9 is a plan view schematically showing a jig conveyance device.

Next, the action of stacking sheet-shaped electrodes 1 with positive electrodes performed at the stacking station 40 will be simply explained. FIG. 9 is a plan view schematically illustrating the jig conveyance device B shown in FIG. 1 and FIG. 2. This FIG. 9 shows the sheet-shaped electrode conveyance device A by broken lines. Referring to FIG. 2 and FIG. 9, the jig conveyance device B is a smaller version of the sheet-shaped electrode conveyance device A and has a function similar to the sheet-shaped electrode conveyance device A. That is, the jig conveyance device B is provided with an elliptical shaped rail 30 comprised of a pair of straight parts arranged in parallel and a pair of semicircular parts and movers 31 of linear motors moving on this rail 30. The movers 31 have structures similar to the movers 12 shown in FIG. 5. The end parts of conveyor platforms 32 extending from the elliptical shaped rail 30 to the outside in the horizontal direction are fixed to the movers 31. These conveyor platforms 32 carry stacking jigs 40.

Now then, as explained while referring to FIG. 8, in the embodiment according to the present invention, the conveyor plates 20 are inverted. In that state, the action of stacking sheet-shaped electrodes 1 with positive electrodes is performed. At this time, as shown in FIG. 8, the top surfaces of the stacking jigs 40 are made to face the sheet-shaped electrodes 1 carried on the conveyor plates 20. In that state, the clamps 21, 22, 23, and 24 of the conveyor plates 20 are disengaged. Due to this, the sheet-shaped electrodes 1 carried on the conveyor plates 20 are made to drop inside the stacking jigs 40 whereby the sheet-shaped electrodes 1 are stacked at the stacking jigs 40. In this case, in the embodiment according to the present invention, a stacking action is performed while making the conveyor plates 20 move in the direction of advance, so while the stacking action is performed, the stacking jigs 40 are conveyed so that the top surfaces of the stacking jigs 40 continue to face the sheet-shaped electrodes 1 carried on the conveyor plates 20.

In this regard, as already explained while referring to FIG. 2 and FIG. 9, the end parts of the conveyor platforms 32 are fixed to the movers 31 of the jig conveyance device B. The stacking jigs 40 are carried on the conveyor platforms 32. Therefore, in the embodiment according to the present invention, the jig conveyance device B is arranged so as to enable the top surfaces of the stacking jigs 40 to continuously face the sheet-shaped electrodes 1 carried on the conveyor plates 20 while the stacking action is being performed, that is, so as to enable the stacking jigs 40 carried on the conveyor platforms 32 to continuously move right under the sheet-shaped electrode conveyance device A while the stacking action is being performed. Furthermore, in the embodiment according to the present invention, the conveyor plates 20 and the conveyor platforms 32 are made to synchronously move so that while the stacking action is being performed, the top surfaces of the stacking jigs 40 continue to face the sheet-shaped electrodes 1 carried on the conveyor plates 20.

In the example shown in FIG. 9, the jig conveyance device B has three conveyor platforms 32 supported by movers 31. The conveyor platforms 32 carry stacking jigs 40. These conveyor platforms 32 are made to move by the movers 31 in the arrow direction. In FIG. 9, for example, when the work of stacking the sheet-shaped electrode 1 carried on a certain conveyor plate 20 onto the stacking jig 40 is performed on the stacking jig 40 on the conveyor platform 32 shown by AX, the work of stacking a sheet-shaped electrode 1 from the conveyor plate 20 following this certain conveyor plate 20 onto the stacking jig 40 is performed on the stacking jig 40 on the conveyor platform 32 shown by BX. On the other hand, the stacking jig 40 on the conveyor platform 32 shown by CX shows the stacking jig 40 at which the work of stacking a sheet-shaped electrode 1 on the stacking jig 40 has already been completed. When the work of stacking a sheet-shaped electrode 1 on the stacking jig 40 has been completed, the conveyor platform 32 is made to move at a high speed to behind the preceding conveyor platform 32, that is, in FIG. 9, the conveyor platform 32 shown by BX.

In this way, the sheet-shaped electrodes 1 successively conveyed by the conveyor plates 20 are successively stacked one by one in the successively conveyed stacking jigs 40 on the conveyor platforms 32. The work of stacking the sheet-shaped electrodes 1 at the stacking jigs 40 is performed at a high speed. Therefore, stacks of preset numbers of sheet-shaped electrodes 1 are formed in the stacking jigs 40 in a short time. If a stack of a preset number of sheet-shaped electrodes 1 is formed, the stacking jig 40 is taken off from the conveyor platform 32 of the jig conveyance device B while holding the stack of the sheet-shaped electrodes 1 for the next processing and an empty stacking jig 40 is placed on the conveyor platform 32.

The stacking jig 40 taken off from the conveyor platform 32 of the jig conveyance device B is transported to a press device where work of pressing the stack of the sheet-shaped electrodes 1 is performed. Next, in the state where the stack of sheet-shaped electrodes 1 is pressed, the side surface parts of the stack of sheet-shaped electrodes 1 are coated with a resin. Due to this, the side surface parts of the sheet-shaped electrodes 1 are fastened together by resin. Next, a positive electrode foil bonding processing is performed to bond aluminum (positive electrode) foil 2 on the sheet-shaped electrodes 1 using an adhesive. Next, a terminal connection processing is performed for connecting electric power take-out terminals to connection-use electrode tabs of the sheet-shaped electrodes 1. Due to this, an electrode stack of sheet-shaped electrodes 1 is produced. The thus formed electrode stack is, for example, surrounded by a laminate film in a bag manner. By electrically connecting a plurality of electrode stacks surrounded by a laminate film in a bag manner in series or in parallel, for example, a battery to be mounted in a vehicle is formed.

Figure 10:
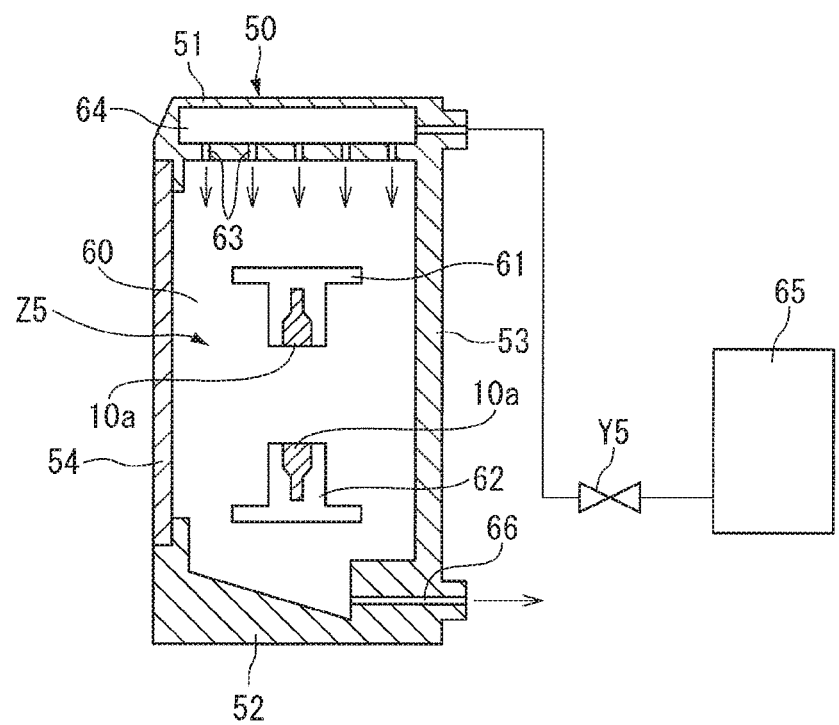
FIG. 10 is a vertical cross-sectional view of sealing walls.

Next, referring to FIG. 1 and FIG. 10, the overall structure of the sealing walls surrounding the sheet-shaped electrode conveyance device A will be explained. Note that, FIG. 10 is a vertical cross-sectional view of the sheet-shaped electrode conveyance device A seen along the line X-X of FIG. 1. Referring to FIG. 1 and FIG. 10, the sheet-shaped electrode conveyance device A as a whole is surrounded by sealing walls 50 comprised of an upper wall 51, bottom wall 52, rear wall 53, front wall 54, and pair of side walls 55, 56. Note that, in FIG. 1, the major part of the view showing the upper wall 51 and the view showing the front wall 54 are omitted, but these upper wall 51 and front wall 54 are formed over the entire distance from one of the side walls 55 to the other of the side walls 56. The sheet-shaped electrode conveyance device A is completely shut off from the outside air by the sealing walls 50.

In the example shown in FIG. 1, inside the sealing walls 50, four partitions 57, 58, 59, and 60 are formed separated from each other by intervals in the direction of conveyance of the sheet-shaped electrodes by the sheet-shaped electrode conveyance device A. The inside of the sealing walls 50 is divided by these partitions 57, 58, 59, and 60 into five inside space regions Z1, Z2, Z3, Z4, and Z5 along the conveyance route of the sheet-shaped electrodes. Note that, the front walls 54 are formed independently for the inside space regions Z1, Z2, Z3, Z4, and Z5, and the front walls 54 are formed into structures which can be opened and closed. These inside space regions Z1, Z2, Z3, Z4, and Z5 are shown in FIG. 8. As will be understood from FIG. 8, in the example shown in FIG. 1, the placement station is made the inside space region Z1, the tab cutoff processing station is made the inside space region Z2, the end insulation processing station is made the inside space region Z3, the electrode test station, positive electrode foil bonding processing station, the foil bonding inspection station are made the inside space region Z4, and the anchor coating processing station and stacking station are made the inside space region Z5.

On the other hand, as shown in FIG. 10, at the partition 60, a pair of opening portions 61, 62 for passage are formed so that the movers 12 and conveyor plates 20 moving on the upper and lower horizontal straight parts 10a of the rail 10 can pass. As will be understood from FIG. 1, in the remaining partitions 57, 58, and 59, opening portions for passage of the same shapes as these opening portions 61, 62 for passage are formed.

Figure 11:
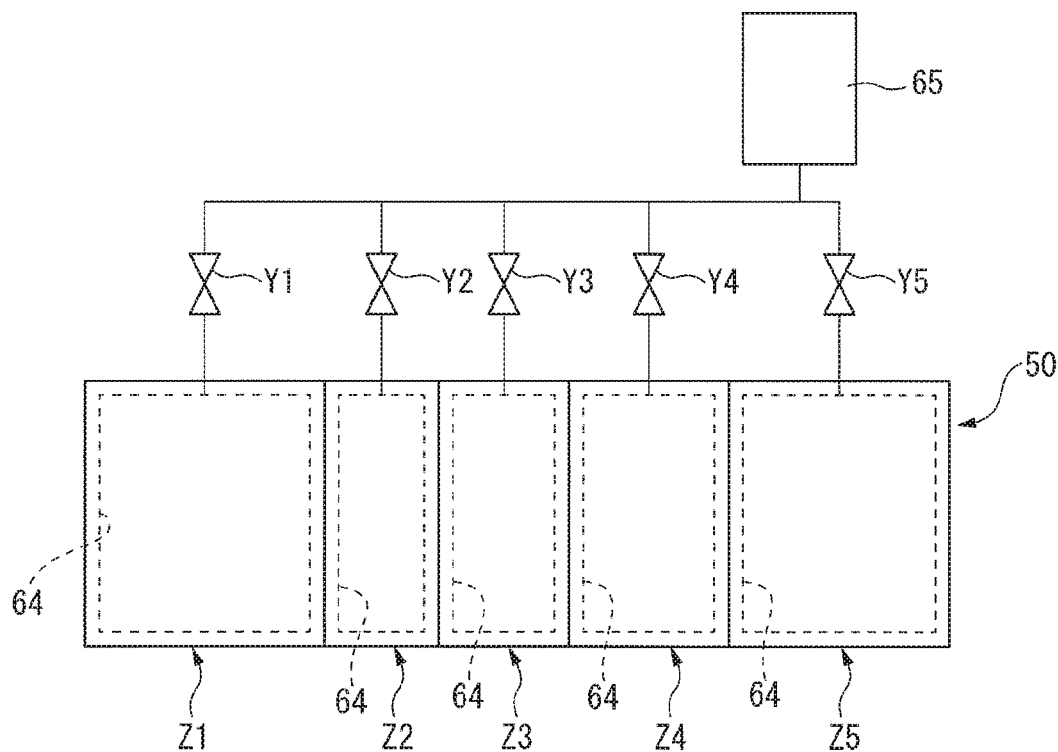
FIG. 11 is a plan view of sealing walls.

Further, as shown in FIG. 10, at the inside of the upper wall 51 of the inside space region Z5, a dry air chamber 64 having a large number of dry air ejection holes 63 is formed. This dry air chamber 64 is connected through a flow rate control valve Y5 to a dry air generating device 65. If the flow rate control valve Y5 opens, dry air generated at the generating device 65 is supplied through the flow rate control valve Y5 to the inside of the dry air chamber 64. The dry air supplied to the inside of the dry air chamber 64 flows from the dry air ejection holes 63 to the inside space region Z5, then is discharged through an exhaust opening 66 provided at the inside space region Z5. In the example shown in FIG. 10, a dry air chamber 64, dry air ejection holes 63, and ejection opening 66 are provided at each of the remaining inside space regions Z1, Z2, Z3, and Z4 as well. As shown in FIG. 11, the dry air chambers 64 of the remaining inside space regions Z1, Z2, Z3, and Z4 also are connected through the corresponding flow rate control valves Y1, Y2, Y3, and Y4 to the dry air generating device 65. Note that, the dry air circulates through the opening portions 61, 62 for passage, so the dry air chamber 64, dry air ejection holes 63, and exhaust opening 66 may also be provided for at least some of the inside space regions Z1, Z2, Z3, Z4, and Z5.

The sheet-shaped electrodes 1 used in the embodiments of the present invention are for all solid state batteries. As explained above, the sheet-shaped electrodes 1 for the all solid state batteries end up deteriorating due to the moisture contained in the atmosphere if exposed to the atmosphere. Therefore, in the embodiments of the present invention, for example, dry air with a dew point of −70 degrees is generated at the generating device 65, and while conveying the sheet-shaped electrodes 1 by the sheet-shaped electrode conveyance device A, dry air with a pressure somewhat higher than atmospheric pressure continues to be supplied from the generating device 65 to the inside space regions Z1, Z2, Z3, Z4, and Z5. Therefore, the sheet-shaped electrodes 1 continue to be exposed to the dry air while being conveyed by the sheet-shaped electrode conveyance device A. Therefore, the sheet-shaped electrodes 1 are kept from deteriorating. Note that, in actuality, even the sheet-shaped electrodes 1 stacked on the storage platforms as shown by Z in FIG. 8, are handled so as not to be exposed to the atmosphere, but explanation of this will be omitted.

Figure 12:
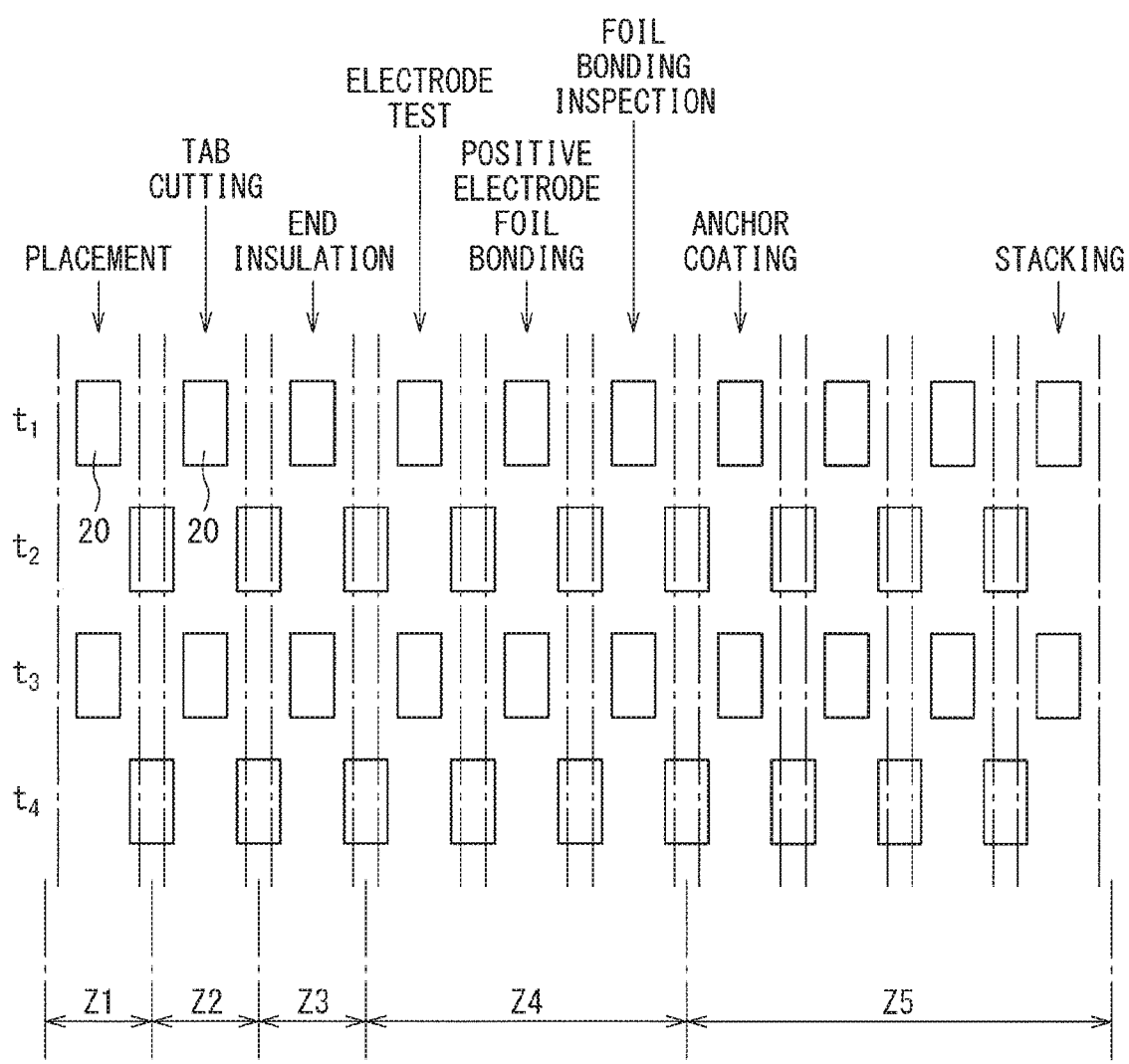
FIG. 12 is a view for explaining the moving state of conveyor plates.
Figure 13:
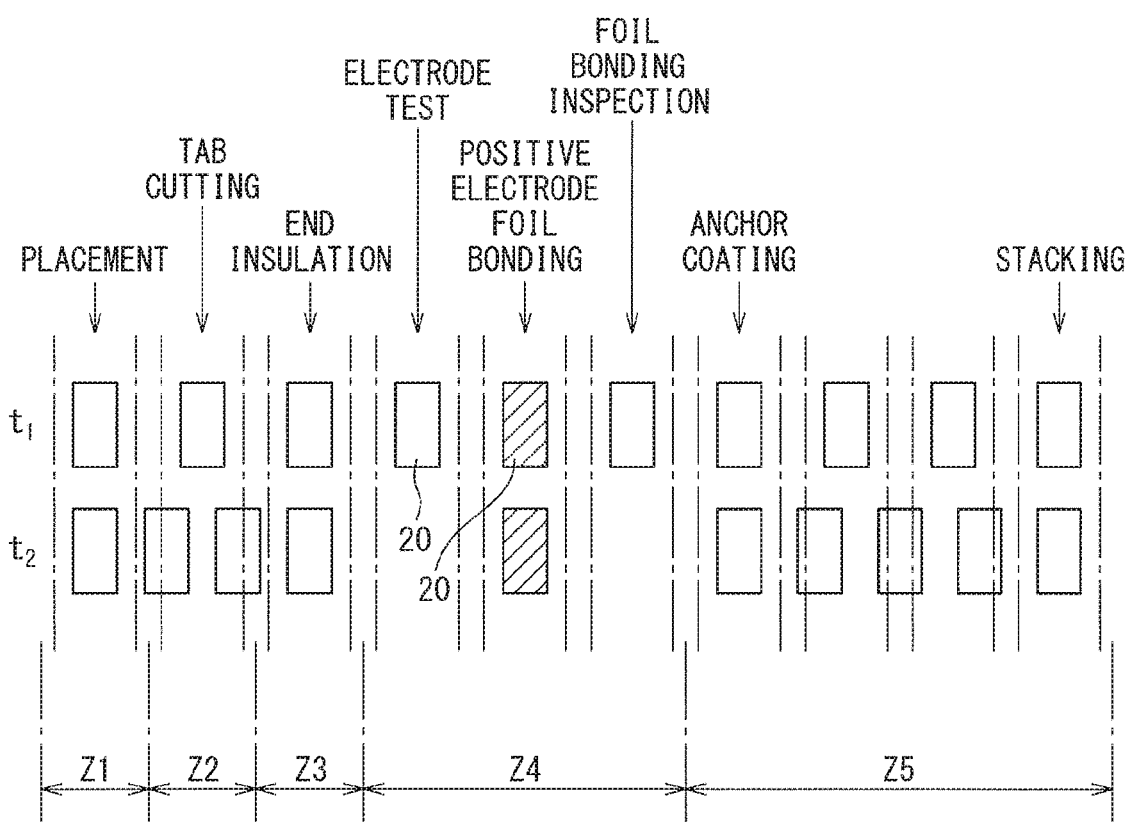
FIG. 13 is a view for explaining a retracted state of conveyor plates.
Figure 14:
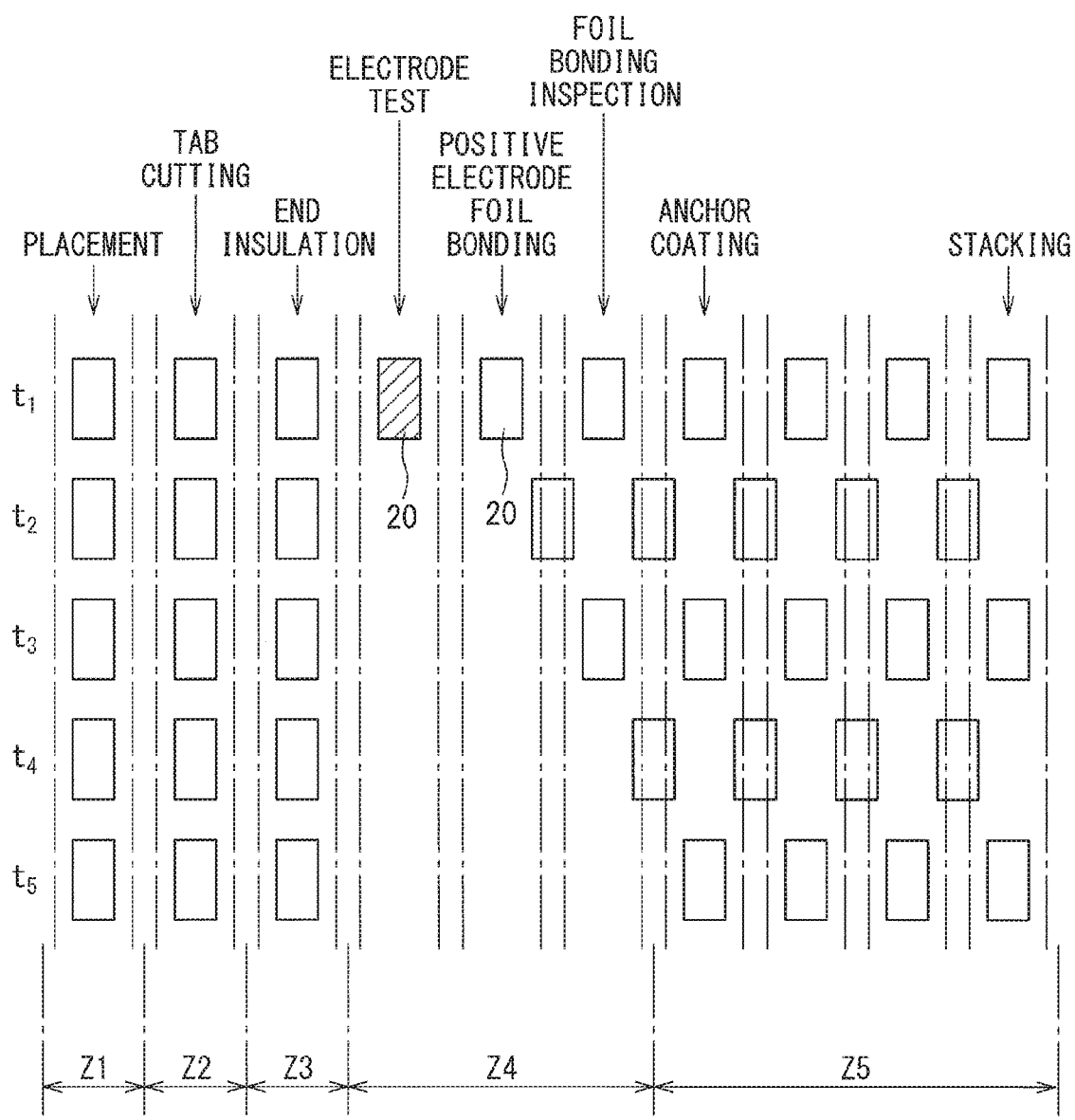
FIG. 14 is a view for explaining a retracted state of conveyor plates.

Next, the control for movement of the conveyor plates 20 at the sheet-shaped electrode conveyance device A will be explained. FIG. 12 to FIG. 14 are views schematically showing the placement station, tab cutting processing station, end insulation processing station, electrode test station, positive electrode foil bonding processing station, foil bonding inspection station, anchor coating processing station, and stacking station shown in FIG. 8 arranged in a line for explaining the state of movement of the conveyor plates 20 carrying the sheet-shaped electrodes 1. Further, these FIG. 12 to FIG. 14 show the case where as one example the placement station, tab cutting processing station, end insulation processing station, electrode test station, positive electrode foil bonding processing station, foil bonding inspection station, and anchor coating processing station are arranged at equal intervals. Further, in FIG. 12 to FIG. 14, the inside space regions Z1, Z2, Z3, Z4, and Z5 are shown. Note that, in FIG. 12 to FIG. 14, the positions of the conveyor plates 20 at the times $t_1$, $t_2$, $t_3$ • • • of each equal time interval are shown.

FIG. 12 shows the case where the action of placing the sheet-shaped electrodes 1 is performed at the placement station at the times $t_1$ and $t_3$, no abnormality occurs at any of the stations, and the action of stacking sheet-shaped electrodes 1 is steadily performed at the stacking station. In this case, it is learned that the sheet-shaped electrodes 1 placed on the conveyor plates 20 at the placement station are successively conveyed to the different stations and a stacking action is finally performed at the stacking station. Further, at this time, the movement of the movers 12 is controlled so that the conveyor plates 20 move at equal intervals.

On the other hand, when sheet-shaped electrodes 1 are being conveyed by the sheet-shaped electrode conveyance device A, for example, sometimes an abnormal sheet-shaped electrode 1 such as one which is extremely bent is found. In this case, this abnormal sheet-shaped electrode 1 has to be removed. In this case, if the operation of the sheet-shaped electrode conveyance device A is stopped once and the front wall 54 of one of the inside space regions Z1, Z2, Z3, Z4, and Z5, for example, the inside space region Z4, where the abnormal sheet-shaped electrode 1 is present, is opened to remove the abnormal sheet-shaped electrode 1, and at this time, if there are other normal sheet-shaped electrodes 1 inside the inside space region Z4, the normal sheet-shaped electrodes 1 will be exposed to the atmosphere. As a result, the normal sheet-shaped electrodes 1 will deteriorate and the normal sheet-shaped electrodes 1 will have to be discarded.

Therefore, in the present invention, when, due to some sort of reason or another such as removal of an abnormal sheet-shaped electrode 1, a need arises to open the front wall 54 of any of the inside space regions Z1, Z2, Z3, Z4, and Z5, before the front wall 54 is opened, that is, before exposure to the atmosphere, the conveyor plates 20 carrying normal sheet-shaped electrodes 1 in any of the inside space regions Z1, Z2, Z3, Z4, and Z5 where the front wall 54 is opened are made to retract to the other of the inside space regions Z1, Z2, Z3, Z4, and Z5. FIG. 13 shows the state of movement of the conveyor plates 20 in this case.

FIG. 13 shows the case where at the time $t_1$ an abnormality is discovered in the sheet-shaped electrode 1 present at the metal foil bonding station inside the inside space region Z4. In FIG. 13, the conveyor plate 20 carrying this abnormal sheet-shaped electrode 1 is shown by hatching. In this case, as will be understood from the time $t_2$ of FIG. 11, the conveyor plates 20 carrying normal sheet-shaped electrodes 1 other than the conveyor plate 20 carrying the abnormal sheet-shaped electrode 1 in the inside space region Z4 are retracted to the insides of the inside space regions Z1, Z2, Z3, and Z5 other than the inside space region Z4. In this case, in the example shown in FIG. 13, the conveyor plate 20 carrying the normal sheet-shaped electrode 1 positioned at the electrode test station in the inside space region Z4 is made to move to the outside of the inside space region Z4, for example, to the inside of the end insulation processing station. At this time, the conveyor plate 20 carrying the sheet-shaped electrode 1 which had been originally positioned at the inside of the tab cutoff processing station and the conveyor plate 20 carrying the sheet-shaped electrode 1 which had been originally positioned at the inside of the end insulation processing station are made to move somewhat toward the placement station. Further, in this case, in the example shown in FIG. 13, the conveyor plate 20 carrying the normal sheet-shaped electrode 1 positioned at the foil bonding inspection station inside the inside space region Z4 is made to move to the outside of the inside space region Z4, for example, to the inside of the anchor coating processing station. At this time, the conveyor plate 20 carrying the sheet-shaped electrode 1 which had been originally positioned at the inside of the anchor coating processing station is made to move somewhat toward the stacking station.

FIG. 14 shows a modification of the case of making the conveyor plates 20 carrying normal sheet-shaped electrodes 1 retract to the other inside space regions Z1, Z2, Z3, Z4, and Z5. This FIG. 13 shows the case where at the time $t_1$, an abnormality is discovered in the sheet-shaped electrode 1 present at the electrode inspection station inside the inside space region Z4. In FIG. 14, this abnormal sheet-shaped electrode 1 is shown by hatching. In this case as well, as will be understood from FIG. 14, the conveyor plates 20 carrying normal sheet-shaped electrodes 1 other than the conveyor plate 20 carrying the abnormal sheet-shaped electrode 1 in the inside space region Z4 are retracted into inside space regions Z1, Z2, Z3, and Z5 other than the inside space region Z4. In this case, in this modification, until the conveyor plates 20 carrying the normal sheet-shaped electrodes 1 in the inside space region Z4 leave the inside space region Z4, all of the conveyor plates 20 present in front of the conveyor plate 20 carrying the abnormal sheet-shaped electrode 1 in the direction of advance are made to move by a speed of advance similar to the normal time shown in FIG. 12. On the other hand, at this time, the conveyor plates 20 carrying the sheet-shaped electrodes 1 positioned at the inside space regions Z1, Z2, and Z3 continue stopped.

It is possible to individually control the movement of the conveyor plates 20 in this way since the sheet-shaped electrode conveyance device A uses linear motors and the movement of the movers 12 can be individually controlled by the operation control device C. Note that, in the example shown in FIG. 1, five inside space regions Z1, Z2, Z3, Z4, and Z5 are formed, but to achieve the object of the present invention, it is sufficient if three or more inside space regions are formed.

In this way, in the embodiment according to the present invention, the stack manufacturing apparatus for manufacturing a stack of sheet-shaped electrodes 1 is provided with the sheet-shaped electrode conveyance device A for conveying sheet-shaped electrodes 1 to the stacking station, which has the rail 10 extending along the conveyance route, a plurality of the movers 12 of linear motors moving over the rail 10, and the conveyor plates 20 attached to the movers 12. The conveyor plates 20 carry sheet-shaped electrodes 1. The sheet-shaped electrode conveyance device A is surrounded by the sealing walls 50. The inside of the sealing walls 50 is divided along the conveyance route by the partitions 57, 58, 59, and 60 into at least three inside space regions Z1, Z2, Z3, Z4, and Z5. At the partitions 57, 58, 59, and 60, the opening portions 61, 62 for passage are formed for passing the movers 12 and conveyor plates 20. Dry air is supplied to at least some of the inside space regions Z1, Z2, Z3, Z4, and Z5. If there is an abnormal sheet-shaped electrode 1 present in any one of the inside space regions Z1, Z2, Z3, Z4, and Z5, the conveyor plates 20 other than the conveyor plate 20 carrying the abnormal sheet-shaped electrode 1 are made to retract to the inside space regions other than the inside space region where the abnormal sheet-shaped electrode 1 is present.

As shown by the time $t_2$ of FIG. 13 or the time $t_5$ of FIG. 14, if the conveyor plates 20 other than the conveyor plate 20 carrying the abnormal sheet-shaped electrode 1 are made to retract to the inside space regions Z1, Z2, Z3, and Z5 other than the inside space region Z4 where the abnormal sheet-shaped electrode 1 is present, the front wall 54 of the inside space region Z4 where the conveyor plate 20 carrying the abnormal sheet-shaped electrode 1 is present is opened and the abnormal sheet-shaped electrode 1 is taken out from the internal space region Z4. At this time, the pressure inside the inside space region Z4 falls to the atmospheric pressure, so dry air inside the inside space regions Z3 and Z5 will pass through the opening portions 61, 62 for passage of the partitions 59, 60 and flow out into the inside space region Z4. Therefore, at this time, the atmosphere will not pass through the opening portions 61, 62 for passage of the partitions 59, 60 and flow into the insides of the inside space regions Z3 and Z5. Further, at this time, the atmosphere will also not pass through the opening portions 61, 62 for passage of the partitions 59, 60 and flow into the insides of the inside space regions Z1 and Z2. Therefore, the sheet-shaped electrodes 1 inside the inside space region Z1, Z2, Z3, and Z5 will not deteriorate.

On the other hand, it is also possible to continue to supply dry air to the inside space region Z4 with the opened front wall 54 at this time, but the dry air supplied dissipates in the atmosphere and is wasted. Therefore, it is preferable to stop the supply of dry air to the inside space region Z4 with the opened front wall 54 or reduce the amount of supply of dry air to the inside space region Z4 compared with the amounts of supply of dry air to the other inside space regions Z1, Z2, Z3, and Z5. Note that, in this case, to further reduce the danger of the atmosphere passing through the opening portions 61, 62 for passage of the partitions 59, 60 and flowing to the insides of the inside space regions Z3 and Z5, it is also possible to increase the amount of supply of dry air to the other inside space regions Z1, Z2, Z3, and Z5.

Figure 15:
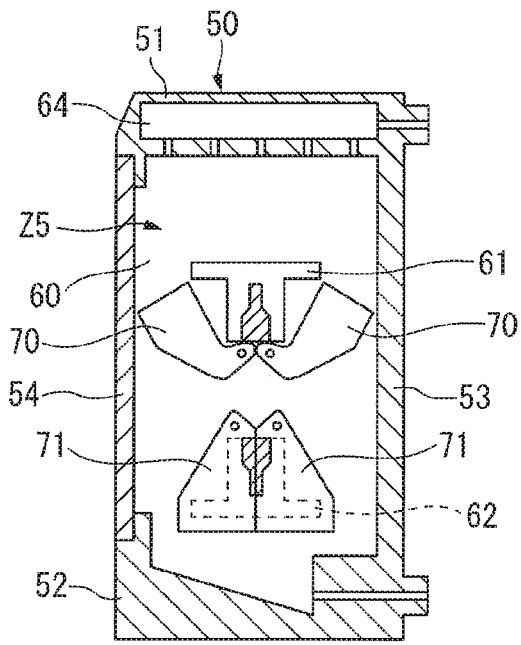
FIG. 15 is a vertical cross-sectional view of modification of sealing walls.

Further, it is also possible to provide opening closing valves 70, 71 able to close the opening portions 61, 62 for passage such as shown in FIG. 15 at the partitions 57, 58, 59, and 60 so as to be able to stop the atmosphere from passing through the opening portions 61, 62 for passage of the partitions 59, 60 and flowing inside the inside space regions Z3 and Z5 by small amounts of supply of dry air. FIG. 15 shows the opening closing valve 70 when opening the opening portion 61 for passage and the opening closing valve 71 when closing the opening portion 62 for passage. These opening closing valves 70, 71 normally open the corresponding opening portions 61, 62 for passage. When for example the front wall 54 of the inside space region Z4 is opened, after the movers 12 and conveyor plates 20 to be retracted pass through the opening portions 61, 62 for passage, the opening portions 61, 62 for passage on the partitions 59, 60 defining the inside space region Z4 are closed by the opening closing valves 70, 71.

Figure 16:
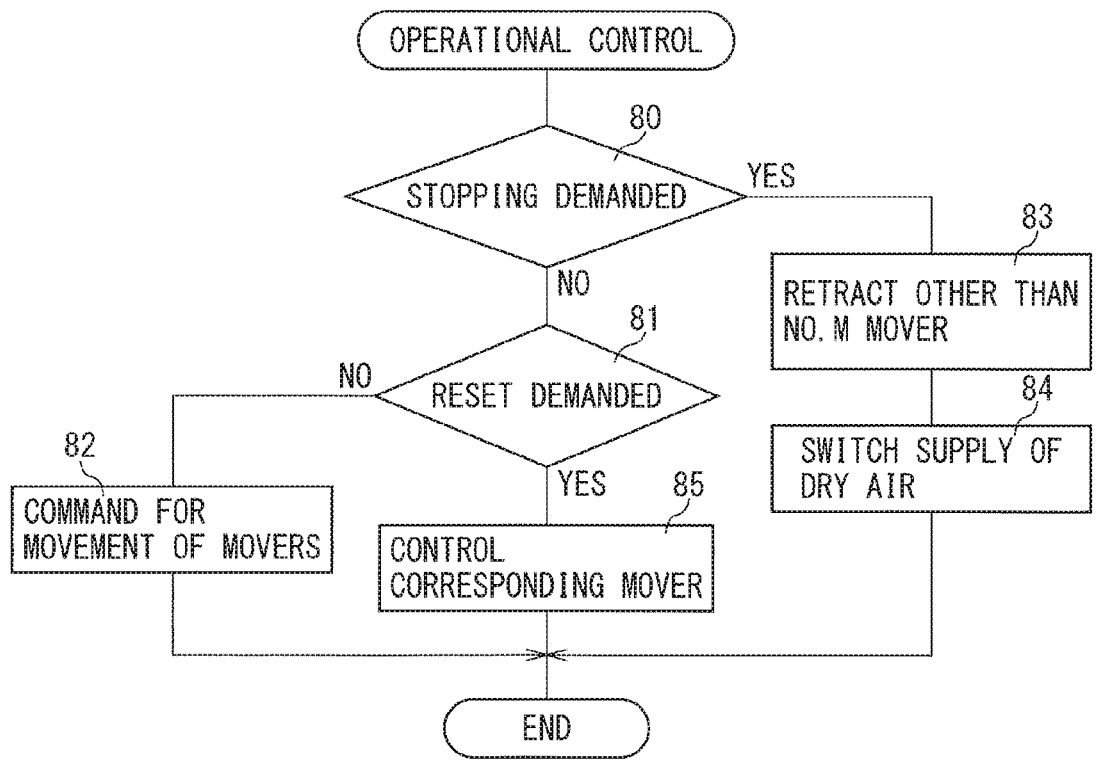
FIG. 16 is a flow chart for control of the operation of the sheet-shaped electrode conveyance device.

The operation control device C houses a computer. FIG. 16 shows the operation control routine of the sheet-shaped electrode conveyance device A performed at this operation control device C. This operation control routine is repeatedly performed. At this operation control device C, in case where the number of the mover 12 of the conveyor plate 20 carrying the abnormal sheet-shaped electrode 1 is the No. M, if the No. M of this mover 12 is input to the operation control device C, it is judged in the operation control device C that there is a demand for stopping the No. M mover 12. Based on this judgment, the operation control routine shown in FIG. 16 is performed. Note that, as explained above, each mover 12 is numbered.

That is, referring to FIG. 16, first, at step 80, it is judged if there is a demand for stopping the No. M mover 12. If it is judged that there is not a demand for stopping the No. M mover 12, the routine proceeds to step 81 where it is judged if there is a demand for reset to the steady state. If it is judged that there is no demand for reset to the steady state, the routine proceeds to step 82 where a movement command is issued for each mover 12. This movement command is, for example, a command to each mover 12 to move spaced apart by a predetermined certain distance from the mover 12 moving one position earlier until passing through the stacking station. Due to this movement command, each mover 12 moves spaced apart by the predetermined certain distance from the mover 12 moving one position earlier unless a stop command is issued.

Next, if at step 80 it is judged that there is a demand for stopping the No. M mover 12, the routine proceeds to step 83. At step 83, the No. M mover 12 is stopped and the conveyor plates 20 of the movers 12 other than the No. M mover 12 are retracted to the inside space regions other than the inside space regions Z1, Z2, Z3, Z4, and Z5 where the No. M mover 12 is present. For example, the No. M mover 12 is stopped at the inside space region Z4 and, as shown in FIG. 13 or FIG. 14, the conveyor plates 20 of the movers 12 other than the No. M mover 12 are retracted to the inside space regions Z1, Z2, Z3, Z5 other than the inside space region Z4 in which the No. M mover 12 is present. Next, at step 84, the switching operation of the supply of dry air is performed. For example, the supply of dry air to the inside space region Z4 is stopped.

Next, if for example the front wall 54 of the inside space region Z4 is opened, the abnormal sheet-shaped electrode 1 carried on the conveyor plate 20 of the No. M mover 12 inside the inside space region Z4 is taken out, the front wall 54 is closed, then the reset to the steady state is demanded, the routine proceeds from step 81 to step 85. At step 85, for example, a reset control of the corresponding mover 12 is performed for resetting the retracted conveyor plates 20 to the positions before retraction. Next, if the retracted conveyor plates 20 are reset to the positions before retraction and due to this the demand for reset is cancelled, the routine proceeds to step 82 where each mover 12 is made to move spaced apart by the predetermined certain distance from the mover 12 moving one position earlier until passing the stacking section.

The invention claimed is:

1. An apparatus for manufacturing a stack of sheet-shaped electrodes comprising;
    a sheet-shaped electrode conveyance device having a rail extending along a conveyance route, a plurality of movers of linear motors moving on the rail, and conveyor plates attached to the movers to convey sheet-shaped electrodes to a stacking station, each conveyor plate carrying a sheet-shaped electrode,
    sealing walls surrounding the sheet-shaped electrode conveyance device and having partitions which divide an inside of the sealing walls into at least three inside space regions along the conveyance route, opening portions for passage of movers and conveyor plates being formed in the partitions, dry air being supplied to at least some of the inside space regions, and
    an operation control device for making conveyor plates other than the conveyor plate carrying an abnormal sheet-shaped electrode retract to inside space regions other than the inside space region where the abnormal sheet-shaped electrode is present when the abnormal sheet-shaped electrode exists in any of the inside space regions.

2. The apparatus according to claim 1, wherein when making the conveyor plates other than the conveyor plate carrying the abnormal sheet-shaped electrode retract to the inside space regions other than the inside space region where the abnormal sheet-shaped electrode is present, the supply of the amount of dry air to the inside space region where the abnormal sheet-shaped electrode is present is stopped or the amount of dry air supplied to the inside space region where the abnormal sheet-shaped electrode is present is reduced compared with the amounts of dry air supplied to the inside space regions other than the inside space region where the abnormal sheet-shaped electrode is present.

3. The apparatus according to claim 1, wherein when making the conveyor plates other than the conveyor plate carrying the abnormal sheet-shaped electrode retract to the inside space regions other than the inside space region where the abnormal sheet-shaped electrode is present, the amount of supply of the amount of dry air to the inside space regions other than the inside space region where the abnormal sheet-shaped electrode is present is made to increase.

4. The apparatus according to claim 1, wherein each partition is provided with an opening closing valve able to close the opening portion for passage.

5. The apparatus according to claim 1, wherein a sheet-shaped electrode includes a collector-use metal foil and at least one of a positive electrode active material layer and negative electrode active material layer formed on the collector-use metal foil.

* * * * *